(12) United States Patent
Ikeda et al.

(10) Patent No.: US 6,332,391 B1
(45) Date of Patent: Dec. 25, 2001

(54) AUTOMATIC BRAKE BOOSTER

(75) Inventors: Masahiro Ikeda; Yoshiyasu Takasaki; Hidefumi Inoue, all of Saitama (JP)

(73) Assignee: Jidosha Kiki Co., Ltd., Tokyo (JP)

( * ) Notice: Subject to any disclaimer, the term of this patent is extended or adjusted under 35 U.S.C. 154(b) by 0 days.

(21) Appl. No.: 09/350,373

(22) Filed: Jul. 9, 1999

(30) Foreign Application Priority Data

Aug. 7, 1998 (JP) .................................................. 10-224515

(51) Int. Cl.[7] ................................ F15B 13/16; F15B 9/10
(52) U.S. Cl. ........................ 91/367; 91/376 R; 91/369.2
(58) Field of Search ................................ 91/367, 376 R, 91/369.2, 369.3

(56) References Cited

U.S. PATENT DOCUMENTS 5,261,313 * 11/1993 Yared .................................. 91/376 R
5,857,399 * 1/1999 Tsubouchi et al. .................. 91/369.1

* cited by examiner

Primary Examiner—Edward K. Look
Assistant Examiner—Michael Leslie
(74) Attorney, Agent, or Firm—Sughrue Mion, PLLC

(57) ABSTRACT

In an automatic brake booster, a sleeve 18 constituting a valve mechanism 15 has a drive portion 50 disposed on the front side, a valve portion 51 forming a second valve seat 19, a mating portion 52 for mating with a valve seat portion when the drive portion is moved forward, and a conical spring 53 disposed between the drive portion and the valve seat portion and used for separating both members from each other. The conical spring is compressed during the normal braking operation so as to make the opening amount of the second valve seat greater than that during the automatic braking operation. Moreover, a plate plunger 40 for transmitting braking counterforce is relatively displaceably provided and a first member 71 and a second member 71 for mutually contacting a reaction disc 41 is also provided, so that the braking counterforce of the first member is transmitted to the sleeve during the automatic braking operation.

8 Claims, 11 Drawing Sheets

AUTOMATIC BRAKE BOOSTER

BACKGROUND OF THE INVENTION

1. Field of the Invention

This invention relates to an automatic brake booster as an automobile brake and the like and more particularly to improvement in its valve mechanism.

2. Description of the Related Art

A heretofore known automatic brake booster typically comprises a valve body slidably provided within a shell, power pistons provided in the valve body, a constant pressure chamber and a variable pressure chamber formed in front of and behind each power piston, a valve mechanism provided for the valve body, an input shaft for switching the passages of the valve mechanism by reciprocally moving a valve plunger constituting the valve mechanism, an output shaft slidably provided in the valve body, and a reaction disc and a plate plunger installed between the base of the output shaft and the valve plunger, the valve mechanism including a first valve seat formed in the valve body, a sleeve slidably fitted into the valve body, a second valve seat formed on the sleeve, valve discs each seated on the first and second valve seats, drive means for switching the passages by displacing the sleeve frontward, and a valve plunger which is relatively displaceably provided for the valve body and the sleeve, and is interlocked with an input shaft and used for switching the passages by displacing the sleeve frontward when the input shaft is moved forward.

In such conventional automatic brake boosters, solenoids are generally employed as drive means.

However, the size of such a solenoid will have to be increased in order to secure greater magnetic force. In conventional valve mechanisms, it has been attempted to reduce the size and weight of the solenoid by decreasing the difference between the magnetic force of the solenoid and the urging force of a urging spring and also decreasing the difference between the urging force of the urging spring and force for urging a sleeve frontward.

For example, the force for urging the sleeve frontward has been relied upon pressure difference acting on a sleeve and a valve disc to be seated on a second valve seat that is formed on the sleeve.

As the smaller the solenoid gap is set, the greater the thrust acting on the sleeve becomes, the solenoid gap has heretofore been set smaller so that sufficient operating response performance may be acquired during the automatic braking operation in consideration of the magnetic force of a small-sized solenoid.

However, the opening amount of the second valve seat will become smaller if the solenoid gap is set smaller and consequently it has been pointed out that the operating response performance of the conventional automatic brake booster is bad at the abrupt braking time during the normal braking operation because the opening amount of the second valve seat has been set equal during the normal braking operation and the automatic braking operation both.

As braking counterforce has been arranged so that it is not transmitted to the sleeve in the conventional automatic brake booster, an attempted has been made to regulate the opening amount of the second valve seat by varying the magnetic force of the solenoid. However, the second valve seat will become fully opened even when the magnetic force of the solenoid is reduced and this has made it difficult to control the braking output. Consequently, the disadvantage is that the braking output becomes excessive in a relatively low speed zone.

Although it is reasoned that the braking counterforce is transmitted to the sleeve by bringing the sleeve into contact with the plate plunger in order to solve the foregoing problem, the opening amount of the second valve seat decreases because the braking counterforce transmitted from the plate plunger becomes too great relative to the magnetic force of the solenoid (thrust of the sleeve) with such an arrangement as mentioned above. Therefore, there still exists a drawback in that an insufficient braking output results in bad operating response performance.

SUMMARY OF THE INVENTION

In view of the situation mentioned above, the present invention has an object to provide an automatic brake booster capable of improving operating response performance at the abrupt braking time during the normal braking operation without impairing operating response performance during the automatic braking operation and also making possible smooth braking output control during the automatic braking operation.

According to a first aspect of the present invention, there is provided an automatic brake booster comprising: a valve body slidably provided within a shell; power pistons provided in the valve body; a constant pressure chamber and a variable pressure chamber formed in front of and behind each power piston; and a valve mechanism for controlling the switching of passages provided in the valve body; wherein the valve mechanism including a first valve seat formed in the valve body, a sleeve slidably fitted into the valve body, a second valve seat formed on the sleeve, valve discs each seated on the first and second valve seats, drive means for switching the passages by displacing the sleeve frontward, and a valve plunger which is relatively displaceably provided for the valve body and the sleeve, and is interlocked with an input shaft and used for switching the passages by displacing the sleeve frontward when the input shaft is moved forward, wherein the sleeve includes a drive portion which is displaced frontward by the drive means, a valve seat portion which is displaced frontward by the valve plunger and forms the second valve seat, a mating portion for displacing the valve seat portion frontward by mating with the valve seat portion when the drive portion is displaced frontward, and an elastic member which is disposed between the drive portion and the valve seat portion and separates both the members from each other, the elastic member holding a situation in which the drive portion and the valve seat portion have been separated from each other when the drive portion is displaced frontward by the drive means, the elastic member being compressed when the valve seat portion is displaced frontward by the valve plunger so as to increase the opening amount of the second valve seat by moving the drive portion closer to the valve seat portion.

According to a second aspect of the present invention, an automatic brake booster comprises a valve body slidably provided within a shell, power pistons provided in the valve body, a constant pressure chamber and a variable pressure chamber formed in front of and behind each power piston, and a valve mechanism for controlling the switching of passages provided in the valve body, the valve mechanism including a first valve seat formed in the valve body, a sleeve slidably fitted into the valve body, a second valve seat formed on the sleeve, valve discs each seated on the first and second valve seats, drive means for switching the passages by displacing the sleeve frontward, and a valve plunger which is relatively displaceably provided for the valve body and the sleeve, and is interlocked with an input shaft and used for switching the passages by displacing the sleeve frontward when the input shaft is moved forward, wherein an elastic member is disposed by forming a predetermined space between the front side of the sleeve and the valve body, and the elastic member restrains the sleeve from being displaced frontward without substantially compressed when the sleeve is displaced frontward by the drive means and is compressed when the sleeve is displaced frontward by the valve plunger so as to increase the opening amount of the second valve seat.

In an automatic brake booster according to a third aspect of the invention, the plate plunger has a first member and a second member which are axially brought into contact with and separated from each other and also allowed to mutually contact the reaction disc; the first member mates with the second member and transmits braking counterforce acting on the second member and braking counterforce acting on the first member to the valve plunger during the normal braking operation; and the first member is separated from the second member kept in contact with the valve body and transmits braking counterforce acting on the first member to the sleeve.

In an automatic brake booster according to a fourth aspect of the invention, the first member makes contact with the sleeve and transmits braking counterforce acting on the first member via the sleeve to the valve plunger during the normal braking operation and transmits braking counterforce acting on the first member to the sleeve separated from the valve plunger during the automatic braking operation; and the second member makes contact with the valve plunger and transmits braking counterforce acting on the second member to the valve plunger during the automatic braking operation, and makes contact with the valve body and transmits braking counterforce acting on the second member to the valve body during the normal braking operation.

According to the first aspect of the invention, the opening amount of the second valve seat can be decrease during the automatic braking operation, whereas the opening amount of the second valve seat can be increased during the normal braking operation by means of the elastic member provided between the drive portion and the valve seat portion. Therefore, operating response performance becomes improvable at the abrupt braking time during the normal braking operation without impairing the operating response performance during the automatic braking operation even through the opening amount of the second valve seat is set greater in order to improve the operating response performance at the abrupt braking time during the normal braking operation because the opening amount of the second valve seat is small during the automatic braking operation.

According to the second aspect of the invention, the opening amount of the second valve seat can be decrease during the automatic braking operation, whereas the opening amount of the second valve seat can be increased during the normal braking operation by means of the elastic member provided between the sleeve and the valve body. Therefore, operating response performance becomes improvable at the abrupt braking time during the normal braking operation without impairing the operating response performance during the automatic braking operation even through the opening amount of the second valve seat is set greater in order to improve the operating response performance at the abrupt braking time during the normal braking operation because the opening amount of the second valve seat is small during the automatic braking operation.

According to the third aspect of the invention, the braking output is controllable like any one of the conventional automatic brake boosters since braking counterforce acting on the first and second members is transmitted to the driver via the valve plunger and the input shaft during the normal braking operation.

On the other hand, braking counterforce acting on only the first member is transmitted to the solenoid during the automatic braking operation, whereby the braking output can be controlled smoothly during the automatic braking operation because the opening amount of the second valve seat is made adjustable against the braking counterforce by varying the magnetic force of the solenoid however it has a small magnetic force.

According to the fourth aspect of the invention, the braking output is controllable like any one of the conventional automatic brake boosters since braking counterforce acting on the first and second members is transmitted to the driver via the valve plunger and the input shaft during the normal braking operation.

On the other hand, braking counterforce acting on only the first member is transmitted to the solenoid during the automatic braking operation, whereby the braking output can be controlled smoothly during the automatic braking operation because the opening amount of the second valve seat is made adjustable against the braking counterforce by varying the magnetic force of the solenoid however it has a small magnetic force.

DETAILED DESCRIPTION OF THE PREFERRED EMBODIMENTS

Now, a description will be given in more detail of preferred embodiments of the present invention with reference to the accompanying drawings.

Figure 1:
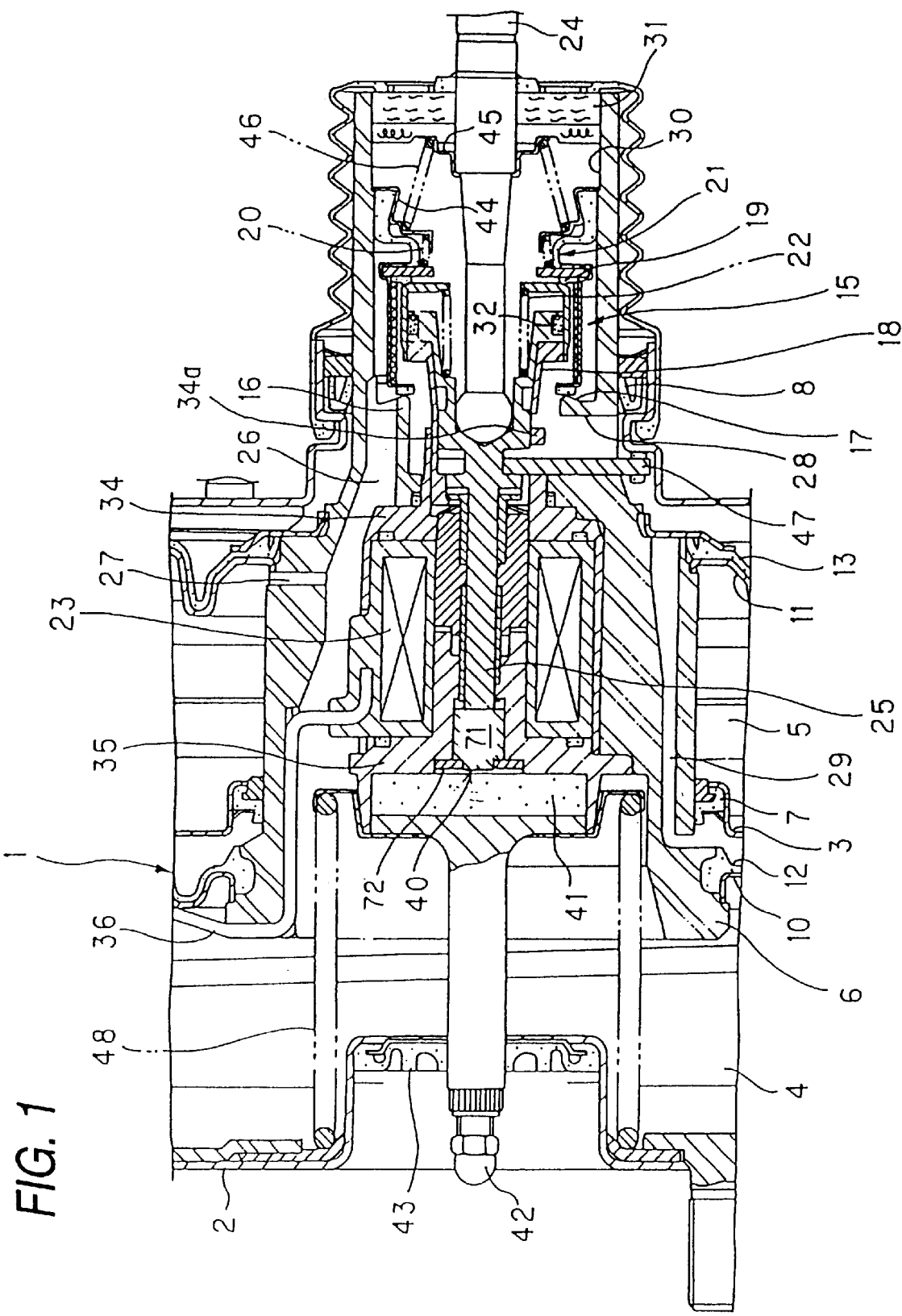
FIG. 1 is a sectional view of an embodiment of the invention.

A first embodiment of the present invention shown in the drawings will now be described. As shown in FIG. 1, the inside of the shell 2 of a tandem brake booster 1 is longitudinally partitioned by a center plate 3 into a front chamber 4 and a rear chamber 5. While a cylindrical valve body 6 is airtightly held by seal means 7 and 8, it is slidably passed through the rear side of the shell 2 and the center plate 3.

The outer peripheral portion of the valve body 6 is positioned in the front and rear chambers 4 and 5 both and these outer peripheral portions thereof are coupled to a front power piston 10 and a rear power piston 11, respectively. A front diaphragm 12 and a rear diaphragm 13 are stretched on the back of the respective power pistons 10 and 11. Further, a constant pressure chamber A and a variable pressure chamber B are formed in front of and behind the front diaphragm 12 within the front chamber 4 and so are a constant pressure chamber C and a variable pressure chamber D in front of and behind the rear diaphragm 13 within the rear chamber 5, respectively.

A valve mechanism 15 for switching communication conditions between the constant pressure chambers A and C and the variable pressure chambers B and D is provided within the valve body 6.

The valve mechanism 15 comprises a first valve seat 17 formed at the leading end of a large-diameter annular projection 16 extending rearward further than the inner peripheral portion of the valve body 6, a sleeve 18 slidably fitted into the valve body 6, a second valve seat 19 provided for the sleeve 18, a valve disc 21 which is urged frontward by a poppet return spring 20 and has a first seat portion S1 seated on the first valve seat 17 as well as a second seat portion S2 seated on the second valve seat 19, an urging spring 22 for urging the sleeve 18 rearward and holding the second valve seat 19 in the advanced position relative to the first valve seat 17, a solenoid 23 as a drive means for displacing the sleeve 18 frontward against the urging spring 22, and a valve plunger 25 provided so as to be displaceable relative to the valve body 6 and the sleeve 18 and interconnected with an input shaft 24.

The valve mechanism 15 further includes an axial constant pressure passage 26 formed within the valve body 6 for communicating a space on the outer side further than the first valve seat 17 with the constant pressure chamber A, a radial constant pressure passage 27 for communicating the constant pressure passage 26 with the constant pressure chamber C, a radial variable pressure passage 28 for communicating the space between the second valve seat 19 and the first valve seat 19 with the variable pressure chamber B, a variable pressure w passage 29 for communicating the constant pressure chamber C with the variable pressure chamber D, and an atmospheric passage 30 formed within a distal cylindrical portion 6A for a communicating a space on the inner side further than the second valve seat 19 with the atmosphere, a filter 31 being provided within the atmospheric passage 30. Further, the constant pressure chamber A is so arranged as to communicate with the intake manifold of an engine via a negative-pressure introducing pipe (not shown) provided in the shell 2, whereby the negative pressure is introduced into the constant pressure chambers A and C at all times.

Then an annular seal ring 32 is provided in the outer peripheral portion of the valve plunger 25 fitted into the sleeve 18, so that the gap between the inner peripheral face of the sleeve 18 and the outer peripheral face of the valve plunger 25 is airtightly held by the seal member 32.

The solenoid 23 is clamped by a yoke 34 fitted into the valve body 6 and a holder 35 and connected to an external control unit (not shown) via wiring 36 fitted along the inner wall of the shell 2.

The right end portion of the valve plunger 25 is coupled to the left end portion of the input shaft 24, and the right end portion of the input shaft 24 is coupled to the a brake pedal (not shown). A plate plunger 40 and a reaction disc 41 which are fitted into the large diameter 35a of the holder 35 are successively disposed on the left side of the valve plunger 25, and the base of an output shaft 42 is brought into contact with the left edge face of the reaction disc 41. The base of the output shaft 42 is contained in the holder 35, whereas the leading end portion of the output shaft 42 is protruded outward further than the shaft portion of the shell 2 via a seal member 43.

A valve return spring 46 is resiliently mounted over a retainer 44 fixedly fitted in the distal cylindrical portion 6A of the valve body 6 and a retainer 45 fitted into the input shaft 24. The input shaft 24 together with the valve plunger 25, the sleeve 18 and the valve disc 21 which are coupled to the input shaft 24 are urged rearward by the elastic force of the valve return spring 46.

The valve plunger 25 is prevented from slipping off the valve body 6 by a known key member 47 while the booster is not operating, the valve plunger 25 is held in the advanced position relative to the valve body 6 by bringing the key member 47 into contact with the rear-side inner face of the shell 2.

A return spring 48 is resiliently mounted over the front-side inner wall of the shell 2 and the valve body 6 whereby to hold the valve body 6 normally in the illustrated non-operating position.

In this embodiment of the invention, however, the sleeve 18, which will be described hereinafter, includes a drive portion 50 to be displaced frontward by the solenoid 23, a valve seat portion 51 to be displaced frontward by the valve plunger 25 with the second valve seat 19, a mating portion 52 that engages with the valve seat portion 51 when the drive portion 50 is displaced frontward so as to displace the valve seat portion 51 frontward, and a conical spring 53 placed between the drive portion 50 and the valve seat portion 51. When the solenoid 23 is operated to apply the automatic brake, it is arranged to improve operating response performance at the abrupt braking time during the normal braking operation without impairing the operating response performance during the automatic braking operation by decreasing the opening amount of the second valve seat 19 during the automatic braking operation by means of the solenoid 23 and increasing the opening amount of the second valve seat 19 during the normal braking operation.

In this embodiment of the invention, the effective diameter of the rolling portion 60 of the valve disc 21 is set equal to that of the seal member 32, and the effective diameter of the second valve seat 19 is set equal to or smaller than those diameters above, which will also be described hereinafter, so that a solenoid 23 having a smaller magnetic force than before is usable.

In this embodiment of the invention, moreover, the plate plunger 40, which will be described hereinafter, is formed with a first member 71 and a second member 72 that are displaceable relatively and mutually made to contact the reaction disc 41. Consequently, the braking output during the automatic braking operation is made controllable without impairing the operability during the normal braking operation by transmitting part of the braking counterforce applied to the first member 71 to the sleeve 18.

Figure 2:
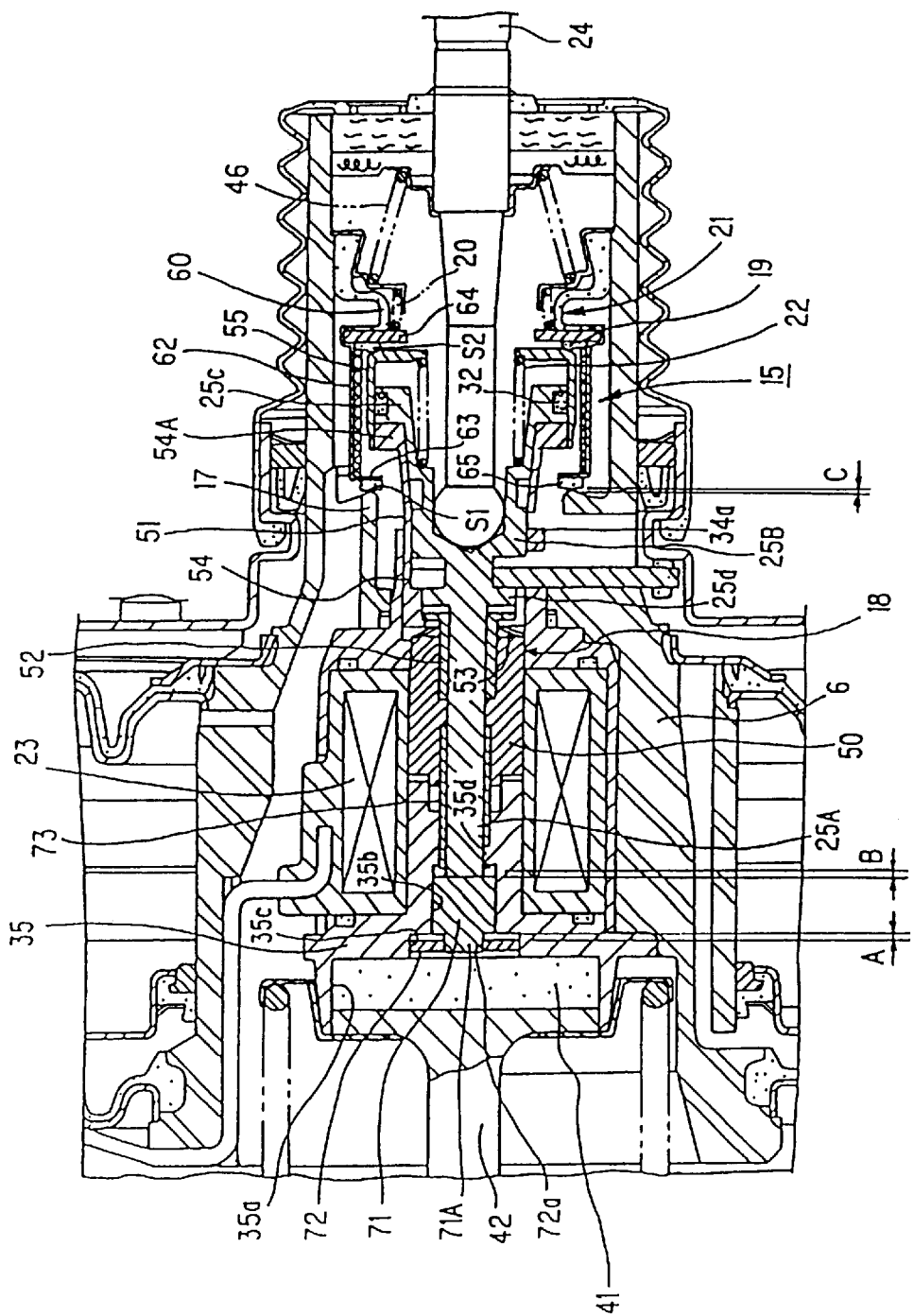
FIG. 2 is an enlarged view of the principal part of FIG. 1.

In this embodiment of the invention, the sleeve 18 includes, as shown by an enlarged view of FIG. 2, the drive portion 50 made of magnetic material passed through the small-diameter portion 25A of the valve plunger 25; the valve seat portion 51 fitted into the body portion 25B of the valve plunger 25 and made of non-magnetic material, its rear-side end portion being projected closer to the first valve seat 17; the mating portion 52 passed through the valve seat portion 51 from the front side, its leading end being pressfitted in the drive portion 50, its tail end radially bent outward, mating with the edge face of the stepped portion within the valve seat portion 51; and the conical spring 53 passed through the mating portion 52 and disposed between the drive portion 50 and the valve seat portion 51. The drive portion 50 is separated from the valve seat portion 51 by the conical spring 53, and the valve seat portion 51 is mating with the tail end of the mating portion 52 in the non-operating condition shown in FIG. 2.

The valve seat portion 51 includes a front-side cylindrical portion 54 fitted into the valve plunger 25 from the front side, a flange portion 54A at its leading end mating with the flange portion 25C of the valve plunger 25; and a rear-side cylindrical portion 55 fitted into the valve plunger 25 from the rear side and positioned rearward further than the first valve seat 17, its tail end being coupled to the flange portion 54A of the front-side cylindrical portion 54. The diameter of the rear-side cylindrical portion 55 is set equal to that of the annular projection 16 and its leading end is radially bent inward, the valve seat 19 equal in diameter to the first valve seat 17 being formed on the outer side of the bent leading end.

The urging spring 22 is resiliently mounted between the back of the rear-side cylindrical portion 55 and the stepped portion of the valve plunger 25, and the sleeve 18 is normally held in the advanced position relative to the valve plunger 25 by bringing the flange portion 54A of the front-side cylindrical portion 54 into contact with the flange portion 25C of the valve plunger 25.

The holder 35 is inserted into the yoke 34 diametrically without any gap in this condition. The small-diameter portion 25A of the valve plunger 25 is slidably supported by the inner peripheral projection 35d of the holder 35 and so is the body portion 25B by the rear-end inner peripheral portion 34a of the yoke 34. With respect to the drive portion 50, a cylindrical portion 73 coupled to the drive portion 50 and extended frontward is slidably supported by the inner periphery of the holder 35 and so is the outer periphery of the body portion thereof by the inner periphery of the yoke 34. Further, the valve seat portion 51 is slidably supported by the intermediate portion 25d of the valve plunger 25 and the outer periphery of the flange portion 25C.

On the other hand, a gap is diametrically formed between the outer periphery of the valve plunger 25 and the inner periphery of the drive portion 50, between the valve seat portion 51 and the inner periphery of the yoke 34 and between the outer periphery of the mating portion 52 and the inner periphery of the valve seat portion 51.

Thereby the valve plunger 25, the drive portion 50 and the valve seat portion 51 are made displaceable relatively and smoothly without mutually sticking to one another.

In this embodiment of the invention, the first and second valve seats 17 and 19 are axially disposed in series as stated above with there effective diameters set equal to each other. In other words, both the valve seats 17 and 19 are set equal in diameter, which unnecessitates enlarging the diameter of the second valve seat 19 and contracting that of the first valve seat 17.

The valve disc 21 to be seated on the first and second valve seats 17 and 19 axially disposed in series includes the rolling portion 60 made of elastic material with its base clamped by the inner peripheral face of the valve body 6 and the outer peripheral face of the retainer 44 fitted into the valve body 6, a backup plate 61 ranging to the front-side end portion of the rolling portion 60; a metal cylindrical portion 62 with its tail end caulked onto the outer periphery of the ago backup plate 61, the cylindrical portion 62 that is extended frontward while surrounding the second valve seat 19; and a backup plate 63 that ranges to the leading end of the cylindrical portion 62 and is bent radially. A seat portion 64 provided on the front-side edge face of the backup plate 61 on one side is used to form the second seat portion S2, whereas a seat portion 65 provided on the front-side edge face of the backup plate 63 on the other is used to form the first seat portion S1. Moreover, the space between the first and second seat portion S1 and S2 is set slightly greater than the space between the first and second valve seats 17 and 19.

In the non-operating condition shown in FIG. 2 wherein the second seat portion S2 is seated on the second valve seat 19, whereas the first seat portion S1 is separated from the first valve seat 17, whereby the negative pressure is introduced into the variable pressure chamber B to equalize the pressures in the constant and variable pressure chambers A and B.

In this condition, pressure difference acting on the sleeve 18 and the rolling portion 60 of the valve disc 21 acts on the valve plunger 25 while the elastic force of the poppet return spring 20 for urging the valve disc 21 frontward is also acting thereon.

Figure 3:
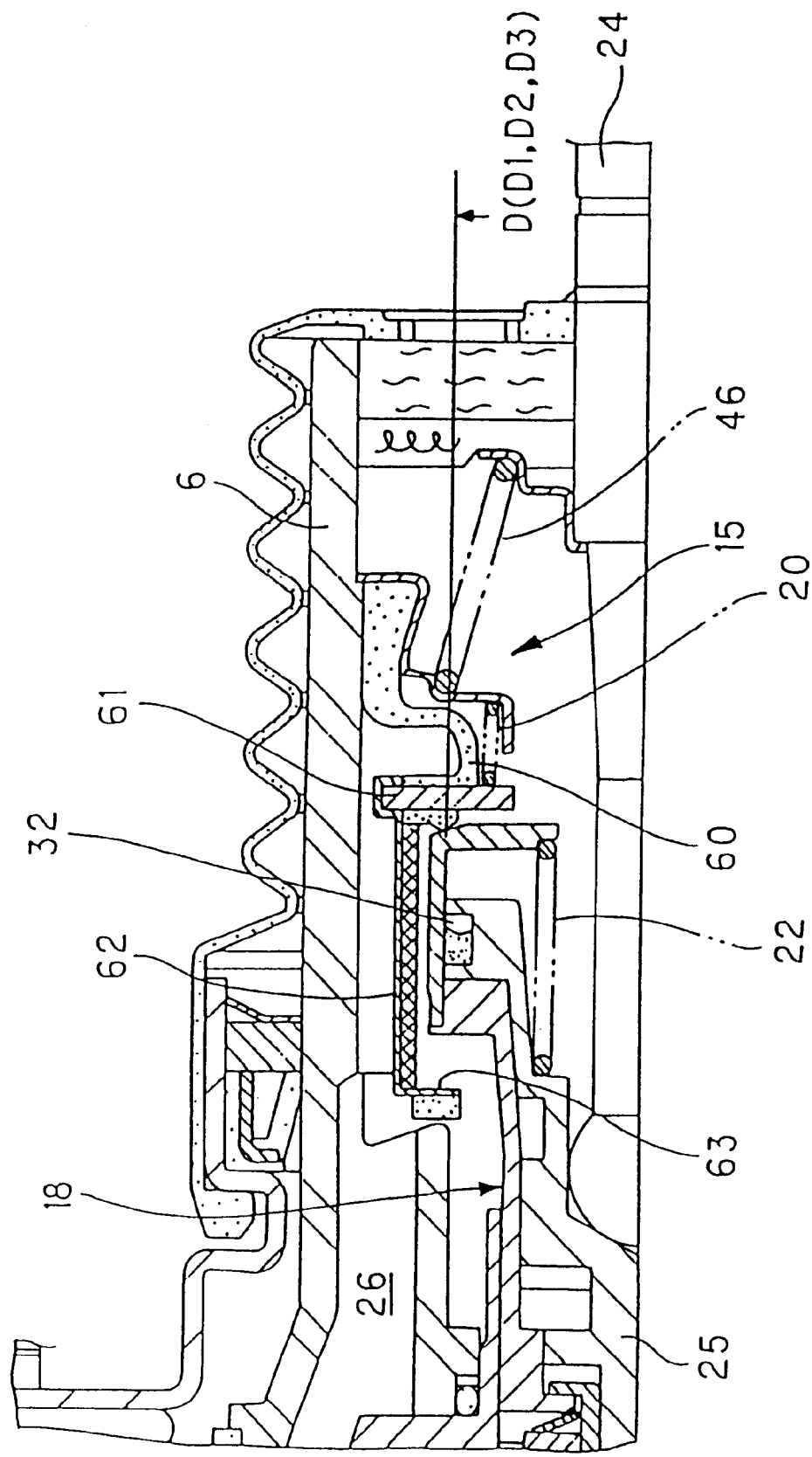
FIG. 3 is an enlarged sectional view of a valve mechanism.

As shown in FIG. 3, by making the effective diameter D1 of the rolling portion 60 radially folded back outward, the effective diameter D3 of the seal member 32 and the effective diameter D2 of the second valve seat 19 conform to a predetermined effective diameter D, the effective diameters D1, D2 and D3 are set equal.

The effective diameter of the seal member 32 is substantially equal to the inner diameter of the sleeve 18.

In this embodiment of the invention, the plate plunger 40 includes, as shown in FIG. 2, the columnar first member 71 slidably fitted into the small-diameter portion 35b of the holder 35 used to form part of the valve body 6, and the ring-like second member 72 slidably fitted in the intermediate-diameter portion 35c of the holder 35. A small-diameter portion 71A formed in the central position of the first member 71 is projected frontward via an opening 72a formed in the central position of the second member 72, so that the small-diameter portion 71A and the second member 72 concentrically formed are allowed to contact the rear-side edge face of the reaction disc 41. The second member 72 mates with the stepped portion of the first member 71 is separated from the holder 35 while the booster is not operating and in this condition, a predetermined gap A is formed between the second member 72 and the holder 35.

In the drive portion 50 of the solenoid 23, the thin-walled cylindrical portion 73 axially extended frontward is integrally and slidably provided between the small-diameter portion 35a of the holder 35 and the valve plunger 25. This cylindrical portion 73 is separated from the first member 71 while the booster is not operating and a predetermined gap B is formed between the cylindrical portion 73 and the first member 71.

The drive portion 50 is stopped in the position where it is moved back by a predetermined gap from the holder 35 while the booster is not operating, the gap being set slightly greater than the gap C of the first seat portion S1 of the valve disc 21 separated from the first valve seat 17.

In this embodiment of the invention, the values of the gaps A, B and C are set to satisfy the following equation: gap A<(gap B−gap C).

In this embodiment of the invention thus arranged, the second seat portion S2 of the valve disc 21 is seated on the second valve seat 19 formed on the sleeve 18, whereas during the non-operating time the first seat portion S1 is separated from the first valve seat 17 of the valve body 6, pressure difference causing the portion positioned on the inner side further than the aforementioned effective diameter D to be urged frontward acts on the rolling portion 60. However, as the pressure difference causing the portion positioned on the inner side further than the effective diameter D is brought to act on the rear-side backup plate 61 to which the leading end of the rolling portion 60 is coupled, pressure difference causing the rolling portion 60 to be urged frontward is canceled thereby and the valve disc 21 is never urged by the pressure difference.

With respect to the sleeve 18, on the other hand, though pressure difference causing the sleeve 18 to be urged frontward acted on the sleeve 18 in the conventional case since its rear-side edge face positioned outward further than the effective diameter D2 of the seal member 32 confronted the negative pressure with its front-side edge face confronting the atmosphere, the sleeve 18 is never urged by the pressure difference according to this embodiment of the invention as its rear-and front-side edge faces both confront the negative pressure.

Further, the first seat portion S1 of the valve disc 21 is seated on the first valve seat 17 formed in the valve body 6, whereas during the operating time the seat portion S2 is separated from the second valve seat 19 formed on the sleeve 18, the first valve seat 17 is equal in diameter to the second valve seat 19, whereby the valve disc 21 is never urged by the pressure difference even during the operating time like the non-operating time.

On the contrary to this embodiment of the invention, the effective diameter of the second valve seat was set greater than that of the seal member, and the effective diameter of the rolling portion of the valve disc was set greater than that of the second valve seat in the conventional valve mechanism. Consequently, the pressure difference acted on the sleeve and the second valve seat seated on the second valve seat formed on the sleeve during the non-operating time of the booster whose valve disc had been separated from the first valve seat.

Therefore, it was difficult to decrease the magnetic force of the solenoid because the urging force of the urging spring was set in consideration of the urging force derived from the pressure difference and the poppet return spring. In this embodiment of the invention, however, it is only needed to set the urging force of the urging spring 22 in consideration of only the poppet return spring 20 (to be precise, there exists sliding resistance between the sleeve 18 and the valve plunger 25 or sliding resistance between the sleeve 18 and the seal member 32) since the sleeve 18 and the valve disc 21 both are free from being urged by the pressure difference. Thus, use can be made of a smaller, more lightweight, inexpensive solenoid 23.

Although the effective diameter D1 of the rolling portion 60, the effective diameter D3 of the seal member 32 and the effective diameter D2 of the second valve seat 19 are set equal to one another in the aforementioned embodiment of the invention, the present invention is not limited to such an embodiment but may be arranged so that the effective diameter D2 of the second valve seat 19 is set smaller than the other effective diameters D1 and D3. Even with this arrangement, the same effect and the same function are achievable since the valve disc is never urged by the pressure difference during the non-operating time.

In this embodiment of the invention thus arranged, since the drive portion 50 made of magnetic material and disposed on the front side and the valve seat portion 51 made of non-magnetic material and disposed on the rear side are separated from each other by the conical spring 53 disposed therebetween, the drive portion 50 and the valve seat portion 51 are maintained in the condition shown in FIG. 2 until the drive portion 50 contacts the holder 35 during the normal braking operation when the input shaft 24 together with the valve plunger 25 and the sleeve 18 are moved forward after the brake pedal is stepped in. When the drive portion 50 contacts the holder 35 thereafter, the valve seat portion 51 operates to compress the conical spring 53 and is moved forward relative to the drive portion 50.

Therefore, the second valve seat 19 is greatly moved forward to the front side relative to the first valve seat 17 during the normal breaking time, whereby the opening amount of the valve between the second valve seat 19 and the valve disc 21 becomes greater.

When the drive portion 50 contacts the holder 35 after the valve seat portion 51 is moved forward together with the drive portion 50 during the automatic braking operation when the solenoid 23 is excited, the valve seat portion 51 is stopped in such a condition that it has been separated from the drive portion 50 by the conical spring 53.

Consequently, the second valve seat 19 is slightly moved frontward relative to the first valve seat 17 during the automatic braking operation and the opening amount of the second valve seat 19 becomes smaller.

In contrast with this embodiment of the invention, the conventional valve mechanism is formed so that the opening amount of second valve seat during the normal and automatic braking operation may become equal whereby to set small the gap (the solenoid gap) between the drive portion and the holder in consideration of operating response performance during the automatic braking operation, which results in making the opening amount of the second valve seat relatively smaller. Although it has been pointed out that the conventional operating response performance is bad at the abrupt braking time during the normal step-in time, the operating response performance at the abrupt braking time during the normal braking operation can be improved without impairing the operating response performance during the automatic braking operation by decreasing the opening amount of the second valve seat 19 during the automatic braking operation in order to increase the opening amount of the second valve seat 19 during the normal braking operation according to this embodiment of the invention.

Figure 4:
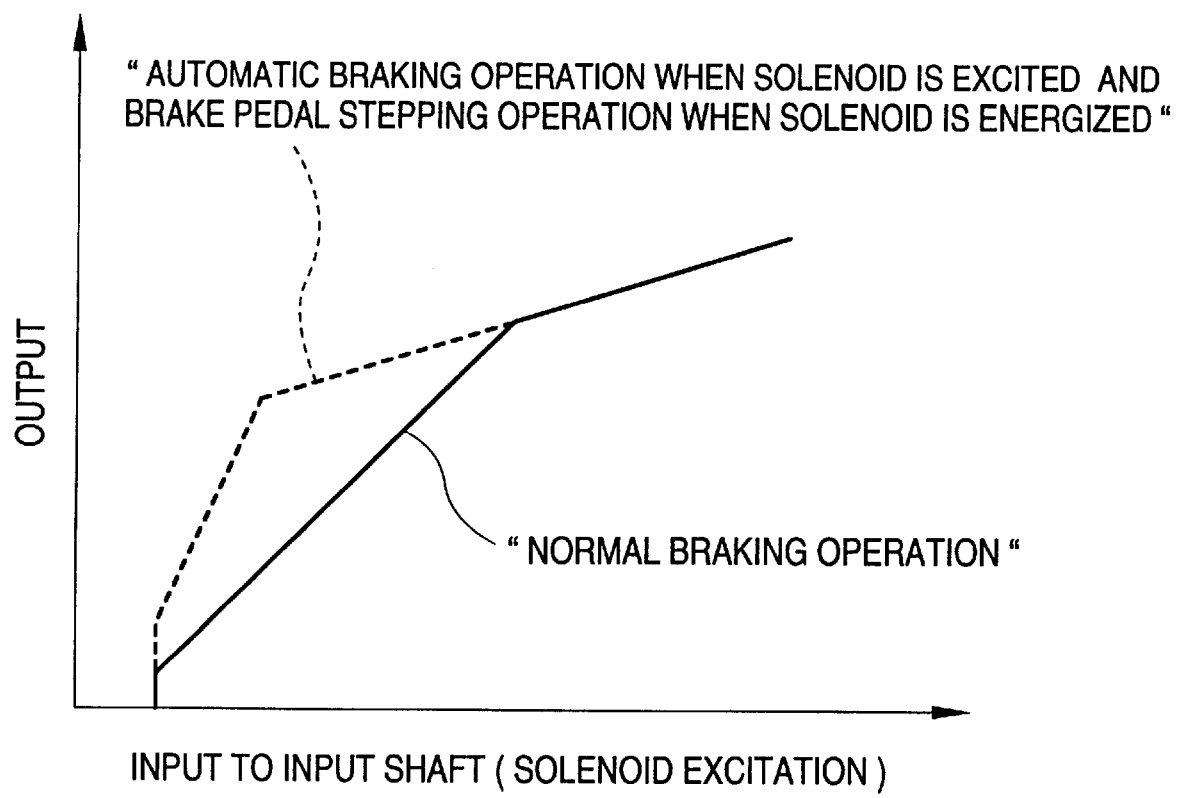
FIG. 4 is a characteristic curve chart of the first embodiment of the invention.

In the embodiment of the invention thus arranged, the output is sharply raised (jumping) without any rise in counterforce until the reaction disc 41 compressed between the holder 35 and the output shaft 42 is expanded and deformed rearward before being brought into contact with the small-diameter portion 71A (the first member 71) and the second member 72 after the valve body 6 and the power pistons 10 and 11 are moved forward as shown by a solid line of FIG. 4 during the normal braking operation when the valve plunger 25, the sleeve 18, the first member 71 and the second member 72 mated with the first member 71 are moved forward after the brake pedal is stepped in. Soon after the reaction disc 41 contacts the small-diameter portion 71A of the first member 71 and the second member 72, counterforce acting on both the members is transmitted to the driver via the valve plunger 25 and the input shaft 24, so that the driver is allowed to control the braking output with the same sense of operating any one of the conventional brake boosters in general.

During the automatic braking operation when the solenoid 23 is excited, on the other hand, the drive portion 50, the valve seat portion 51 and the cylindrical portion 73 keep the condition shown in FIG. 2 and are integrally moved forward until they contact the holder 35 and when the second valve seat 19 is opened, the pressure difference acts moving the valve body 6 and the power pistons 10 and 11 forward.

As shown by a chain line of FIG. 4 then, the reaction disc 41 compressed between the holder 35 and the output shaft 42 is expanded and deformed rearward and the output (the braking output) is sharply raised (jumping) without the transmission of the braking counterforce similarly during the normal braking operation until the reaction disc 41 contacts the small-diameter portion 71A and the second member 72. The reaction disc 41 is soon brought into contact with the small-diameter portion 71A of the first member 71 and the second member 72 and even though both the members, the valve plunger 25 and the input shaft 24 are moved backward relative to the valve body 6 (practically, the valve body 6 is relatively moved forward), the output is sharply raised without the continuous transmission of braking counterforce until the first member 71 is brought into contact with the cylindrical portion 73.

The second member 72 which mates with the first member 71 and is moved backward is brought into contact with the stepped portion of the holder 35 and stopped to move backward as the gap A is consumed. However, the first member 71 is kept moving backward and then brought into contact with the cylindrical portion 73 stopped at the advance end position relative to the valve body 6 as the gap B (to be precise, gap B–gap C) is consumed soon. Further, braking counterforce acting on the small-diameter portion 71A of the first member 71 is transmitted to the drive portion 50 at this point of time and this causes the sharply rising braking output to rise at a predetermined servo ratio thereafter. Consequently, the braking counterforce and the thrust of the solenoid 23 are placed in a servo balance condition in the balanced position.

Therefore, the braking output during the automatic braking operation is made controllable against counterforce acting on the first member 71 by changing the magnetic force of the solenoid 23 so as to alter the thrust of the drive portion 50.

Since only braking counterforce acting on the small-diameter portion 71A is transmitted to the drive portion 50 at this time, the braking counterforce can be varied greatly by slightly altering the thrust of the drive portion 50.

In contrast with this embodiment of the invention, as it was arranged that the counterforce was not transmitted to the sleeve in the conventional automatic brake booster, the second valve seat became uniformly opened during the automatic braking operation, thus making the braking output excessive in a low speed zone because the braking output was uncontrollable. According to this embodiment of the invention, however, the braking output is made smoothly controllable by changing the magnetic force of even a small-sized solenoid 23 though having a small magnetic force.

Now, the area of the small-diameter portion 71A of the first member 71 is properly set, whereby when the driver steps in the brake pedal while power is supplied to the solenoid 23, the servo ratio can be set higher than that at the time the pedal is normally stepped in. In this case, exceedingly excellent operating response performance can be acquired by simultaneously using jumping greater than that during the normal braking operation.

Figure 5:
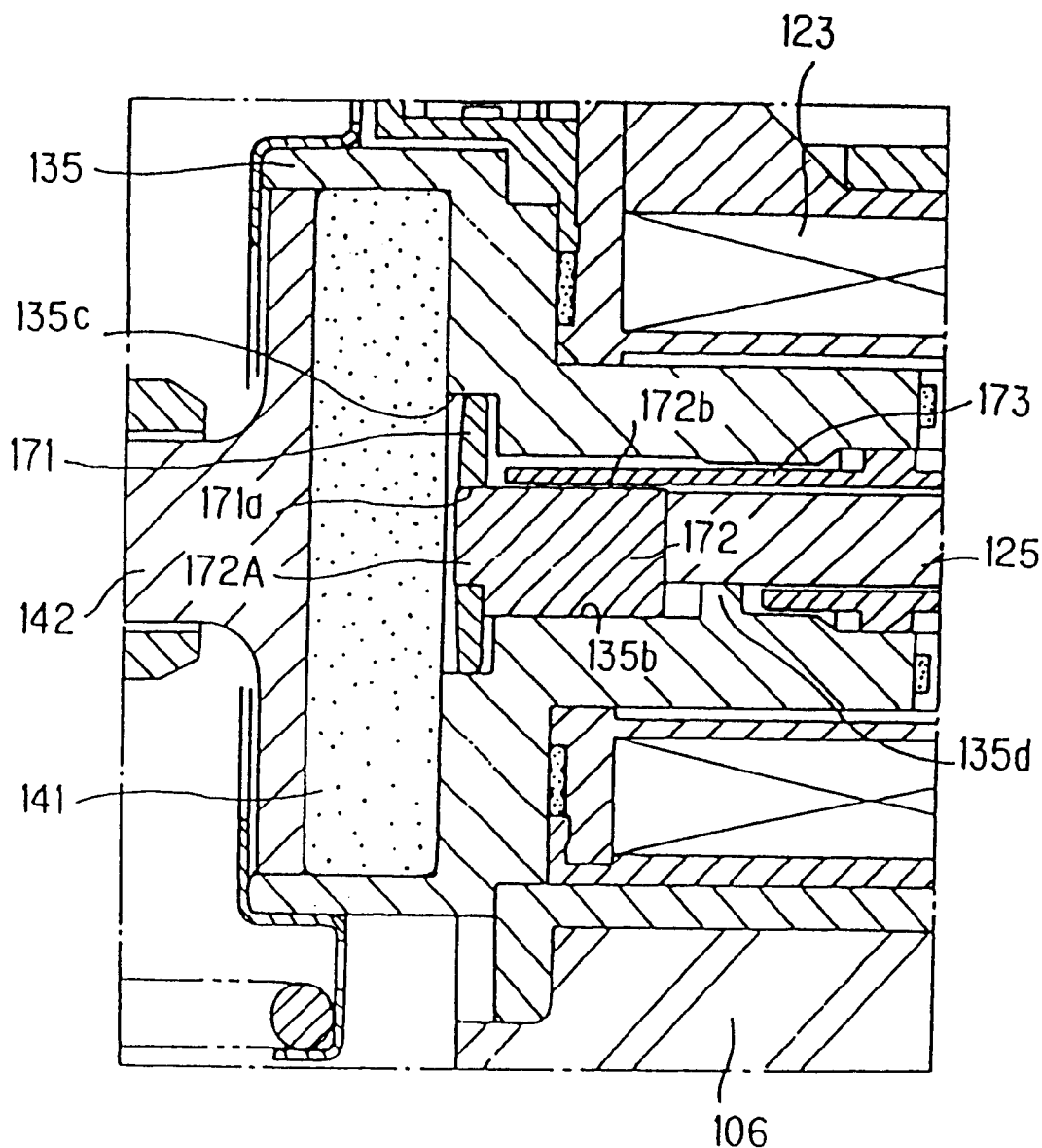
FIG. 5 is an enlarged sectional view of the principal part of a second embodiment of the invention.

Subsequently, FIG. 5 shows a second embodiment of the invention. Instead of fitting the first member 71 into the small-diameter portion 35b of the holder 35 and fitting the second member 72 into the intermediate-diameter portion 35c in the first embodiment of the invention, a first member 171 is fitted into an intermediate-diameter portion 135c, and a second member 172 is fitted into a small-diameter portion 135b in the second embodiment thereof.

An opening 171a for passing the small-diameter portion 172A of the second member 172 therethrough is provided in the center position of the first member 171 so that the small-diameter portion 172A can be brought into contact with the rear-side edge face of a reaction disc 141 through the opening 171a.

The upper portion of the outer peripheral portion of the second member 172 is cut out and a cylindrical portion 173 is passed through a cutout 172b and made to face the first member 171. A gap equal in a sliding amount to a drive portion is formed between the first member 171 mated with the second member 172 and the cylindrical portion 173 at the time the booster is not operated, whereby the cylindrical portion 173 is moved forward up to and brought into contact with the first member 171 initially during the automatic braking operation as illustrated in FIG. 5.

An arrangement of members other than those described above is identical with the arrangement referred to in the first embodiment of the invention, wherein like reference numbers with the addition of "100" designate like members in the first embodiment thereof.

Figure 6:
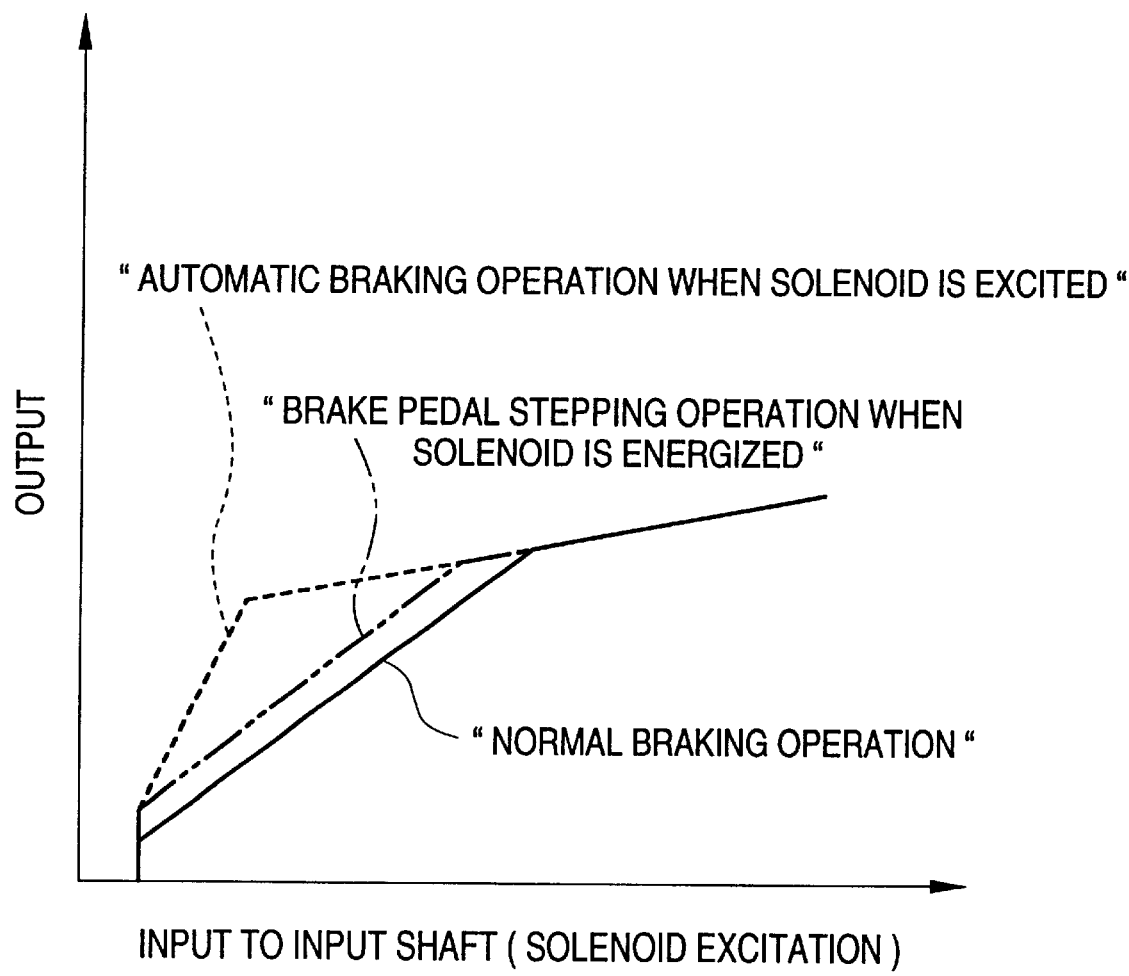
FIG. 6 is a characteristic curve chart of the second embodiment of the invention.

In the second embodiment of the invention thus arranged above, the output is sharply raised (jumping) without any rise in counterforce until the reaction disc 141 compressed between a holder 135 and an output shaft 142 is expanded and deformed rearward before being brought into contact with the small-diameter portion 172A (the second member 172) and the first member 171 after a valve body 106 and power pistons are moved forward as shown by a solid line of FIG. 6 during the normal braking operation when an input shaft together with a valve plunger 125, the second member 172 and the first member 171 mated with the second member 172 are moved forward after the brake pedal is stepped in. Soon after the reaction disc 141 contacts the first member 171 and the small-diameter portion 172A, counterforce acting on both the members is transmitted to the driver via the valve plunger 125 and the input shaft, so that the driver is allowed to control the braking output with the same sense of operating any one of the conventional brake boosters in general.

On the other hand, the drive portion together with the valve seat, the cylindrical portion 173 and the holder 135 are integrally moved forward until they contact the holder 135 during the automatic braking operation when the solenoid 124 is excited and a second valve seat is opened, whereby pressure difference acts on and moves the valve body 106 and the power pistons forward.

As shown by a chain line of FIG. 6 then, the reaction disc 141 compressed between the holder 135 and the output shaft 142 is expanded and deformed rearward and the output (jumping) is raised without the transmission of counterforce similarly during the normal braking operation until the reaction disc 141 contacts the first member 171 and the small-diameter portion 172A.

When the reaction disc 141 contacts the first member 171 and the small-diameter portion 172A, the first member 171 and the cylindrical portion 173 in contact therewith are mated with the second member 172 before being moved backward. Then the first member 171 is stopped at a position where the thrust of the solenoid 123 and braking counterforce acting on itself are balanced. The second member 172 is moved backward and separated from the first member 171 and furthermore mated with an inner peripheral projection 135d projecting from the small-diameter portion 135b of the holder 135 before being stopped.

Consequently, braking counterforce acting on the second member 172 is received by the valve body 106 and only braking counterforce acting on the first member 171 is transmitted to a sleeve 118.

In the second embodiment of the invention, function and effect similar to those attained in the first embodiment thereof are apparently obtainable.

In this second embodiment of the invention unlike the first embodiment thereof, as it is arranged that the valve plunger 125 is brought into contact with the second member 172 even when the driver steps in the brake pedal while power is supplied to the solenoid 123, the area of the first member 171 and that of the small-diameter portion 172A of the second member 172 are set so that a servo ratio during the normal braking operation can be obtained likewise as shown by a chain double-dashed line of FIG. 6, whereby the brake can be operated without a feeling of wrongness even though the driver steps in the brake pedal even during the automatic braking operation.

Figure 7:
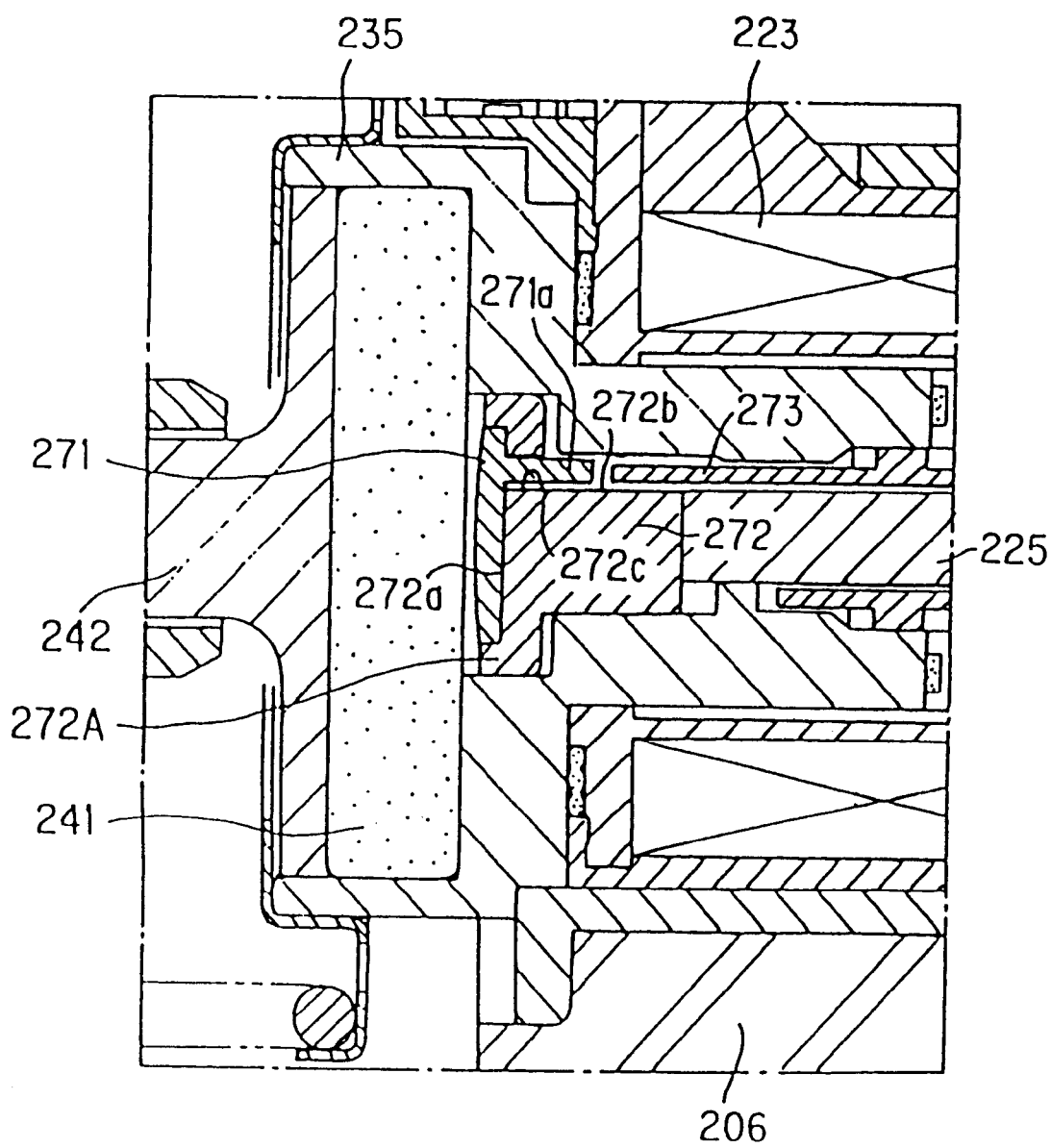
FIG. 7 is an enlarged sectional view of the principal part of a third embodiment of the invention.

FIG. 7 shows a third embodiment of the invention, wherein though the small-diameter portion 172A of the second member 172 is passed through the first member 171 before being brought into contact with the reaction disc 141 in the second embodiment thereof, a first member 271 is contained in a recessed portion 272a formed in the central position of the large-diameter portion 272A of a second member 272, and a leg portion 271a extending rearward from the first member 271 is projected rearward via a through-hole 272c bored in the upper portion of the second member 272 and made to face a cylindrical portion 273 according to the third embodiment thereof.

As in the second embodiment of the invention, a gap slightly greater than the sliding amount of a drive portion is formed between the leg portion 271a of the first member 271 mated with the second member while the booster is not operating in the third embodiment thereof.

An arrangement of members other than those described above is identical with the arrangement referred to in the second embodiment of the invention, wherein like reference numbers with the addition of "100" designate like members in the second embodiment thereof.

Even in the third embodiment of the invention thus arranged, braking counterforce acting on the large-diameter portion 272A of the second member 272 is transmitted to the driver during the normal braking operation and the first member 271 is brought into contact with the cylindrical portion 273 and moved backward before being stopped during the automatic braking operation; however, function and effect similar to those attained in the second embodiment thereof are obtainable because the second member 272 is separated thereby and brought into contact with a valve body 206 before being stopped.

Figure 8:
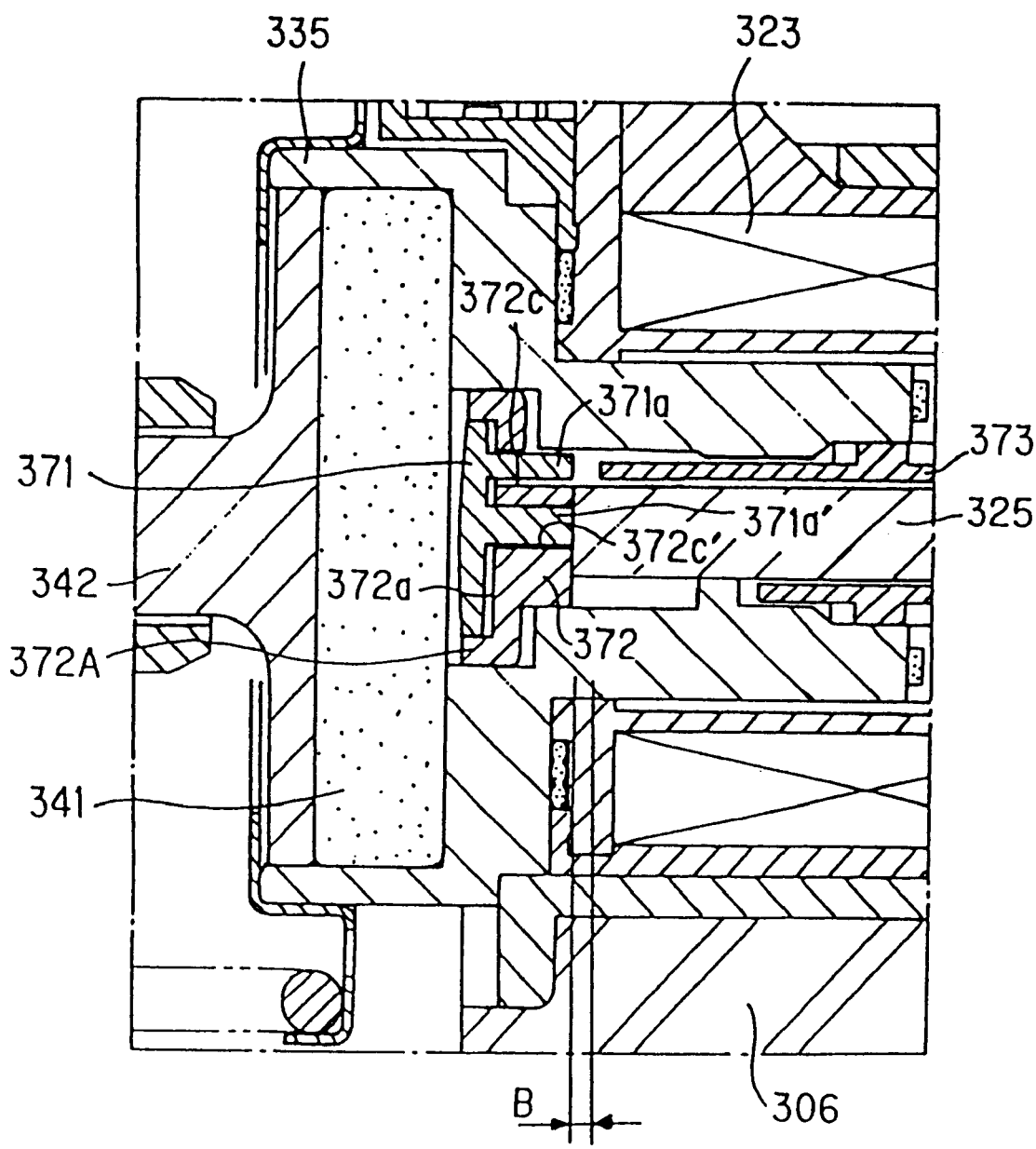
FIG. 8 is an enlarged sectional view of the principal part of a fourth embodiment of the invention.

FIG. 8 shows a fourth embodiment of the invention, wherein though the gap between the leg portion 271a and the cylindrical portion 273 has to be set substantially equal to the sliding amount of the drive portion because the first member 271 is mated with the second member 272 while the booster is not operating in the third embodiment thereof, so that the jumping becomes smaller in the third embodiment thereof than that in the first embodiment thereof to the extent that the gap is reduced, one leg portion 371a is separated from a cylindrical portion 373 by a gap B while the booster is not operating by bringing the other leg portion 371a' into contact with a valve plunger 325 in this fourth embodiment thereof.

An arrangement of members other than those described above is identical with the arrangement referred to in the third embodiment of the invention, wherein like reference numbers with the addition of "100" designate like members in the third embodiment thereof.

In the fourth embodiment of the invention thus arranged, initial braking force can be improved because jumping is increasable further while the function and effect of the third embodiment thereof are maintained.

Figure 9:
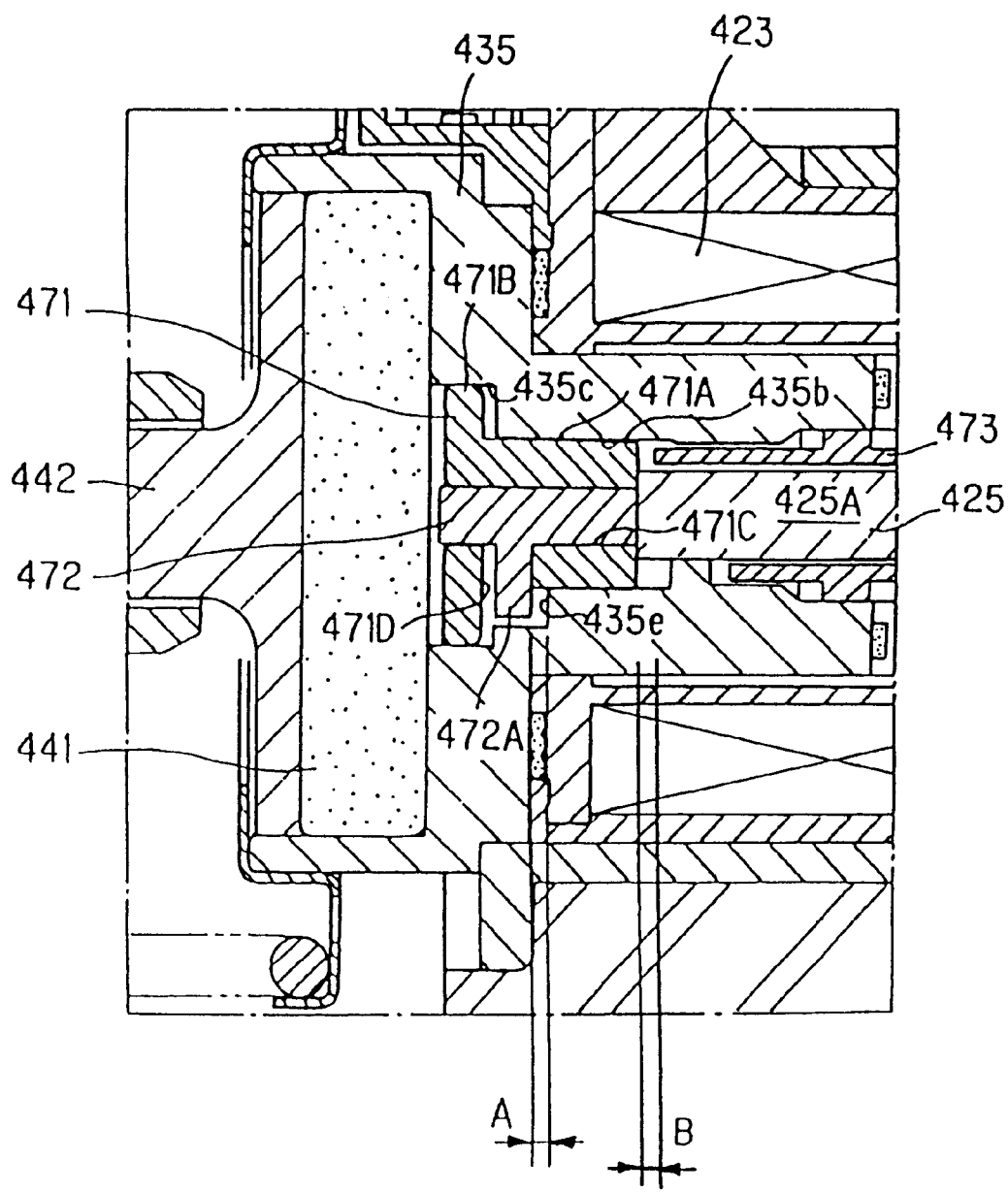
FIG. 9 is an enlarged sectional view of the principal part of a fifth embodiment of the invention.

FIG. 9 shows a fifth embodiment of the invention, wherein though the first member 371 is contained in the second member 372 in the fourth embodiment thereof, a second member 472 is contained in a first member 471 so as to attain the same function and the same effect of the fourth embodiment thereof.

More specifically, the first member 471 is a stepped-cylindrical one formed from a small-diameter portion 471A and a large-diameter portion 471B fitted into the small-diameter portion 435b and intermediate-diameter portion 435c of the holder 435. The inner diameter of the first member 471 is formed smaller than the small-diameter portion 425A of the valve plunger 425, whereby its rear-side edge face is allowed to contact the valve plunger 425 or a cylindrical portion 473.

The gap B is formed between the small-diameter portion 471A of the first member 471 and the cylindrical portion 473 during the non-operating time when the first member 471 contacts the valve plunger 425.

On the other hand, the second member 472 which is formed into cylindrical shape is slidably fitted into a a through-hole 471C bored in the shaft portion of the first member 471 and provided with a mating portion 472A radially projecting outward via a slide hole 471D bored in the outer peripheral portion of the first member, the mating portion 472A being contained in a cutout 435e made by cutting out part of the small-diameter portion 435b of a holder 435.

The mating portion 472A is separated from the base of the cutout 435e frontward by the gap C during the non-operating time when the second member 472 contacts the valve plunger 425.

While the booster is not operating, the gap B is formed between the mating portion 472A and the sliding hole 471D so that the first member 471 can be displaced rearward relative to the second member 472, whereby even when the mating portion 472A is brought into contact with the holder 435 and moved backward before being stopped, the first member 471 can be displaced rearward by the gap B.

Even in the fifth embodiment of the invention thus arranged, the function and effect of the fourth embodiment thereof are obtainable likewise.

Figure 10:
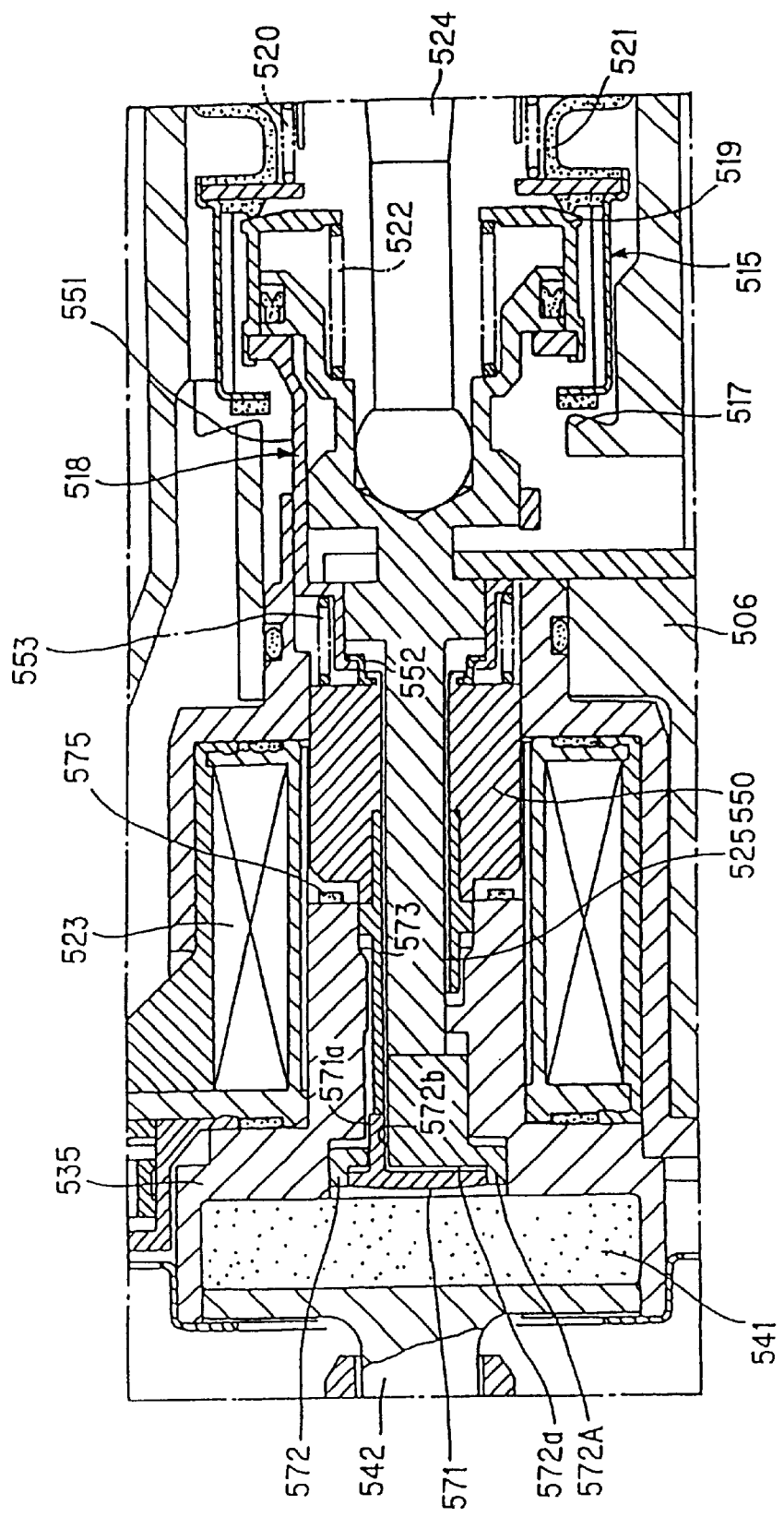
FIG. 10 is an enlarged sectional view of the principal part of a sixth embodiment of the invention.

FIG. 10 shows a sixth embodiment of the invention, wherein though the gap is formed between the first member and the cylindrical portion while the booster is not operating in the first to fifth embodiments thereof, a first member 571 is brought into contact with a cylindrical portion 573, and a predetermined gap is formed between the first member 571 and a second member 572 kept in contact with a valve plunger 525.

More specifically, the first member 571 is disc-shaped and fitted into a recessed portion 572a formed in the large-diameter portion 572A of the second member 572 fitted into a holder 535 and brought into contact with the cylindrical portion 573 by projecting a leg portion 571a rearward from a through-hole 572b formed in the second member 572.

While the booster is not operating, a gap is formed between the rear-side edge face of the first member 571 and the base of the recessed portion 572a of the second member 572, and the first member 571 is projected frontward relative to the second member 572.

Although the conical spring 53 is disposed between the drive portion 50 and the valve seat portion 51 in the first embodiment of the invention, a coil spring 553 in place of the conical spring 53 is resiliently mounted in the sixth embodiment thereof.

In the sixth embodiment of the invention, moreover, an elastic member 575 is provided circumferentially on the rear-side edge face of a holder 535 in order to prevent striking sound produced when a drive portion 550 is brought into contact therewith.

An arrangement of members other than those described above is identical with the arrangement referred to in the first embodiment of the invention, wherein like reference numbers with the addition of "500" designate like members in the first embodiment thereof.

In the sixth embodiment of the invention thus arranged, the first and second members 571 and 572 are moved forward while holding the condition illustrated during the normal braking operation when an input shaft 524, the valve plunger 525 and a sleeve 518 mated therewith are moved forward after the brake pedal is stepped in.

Figure 11:
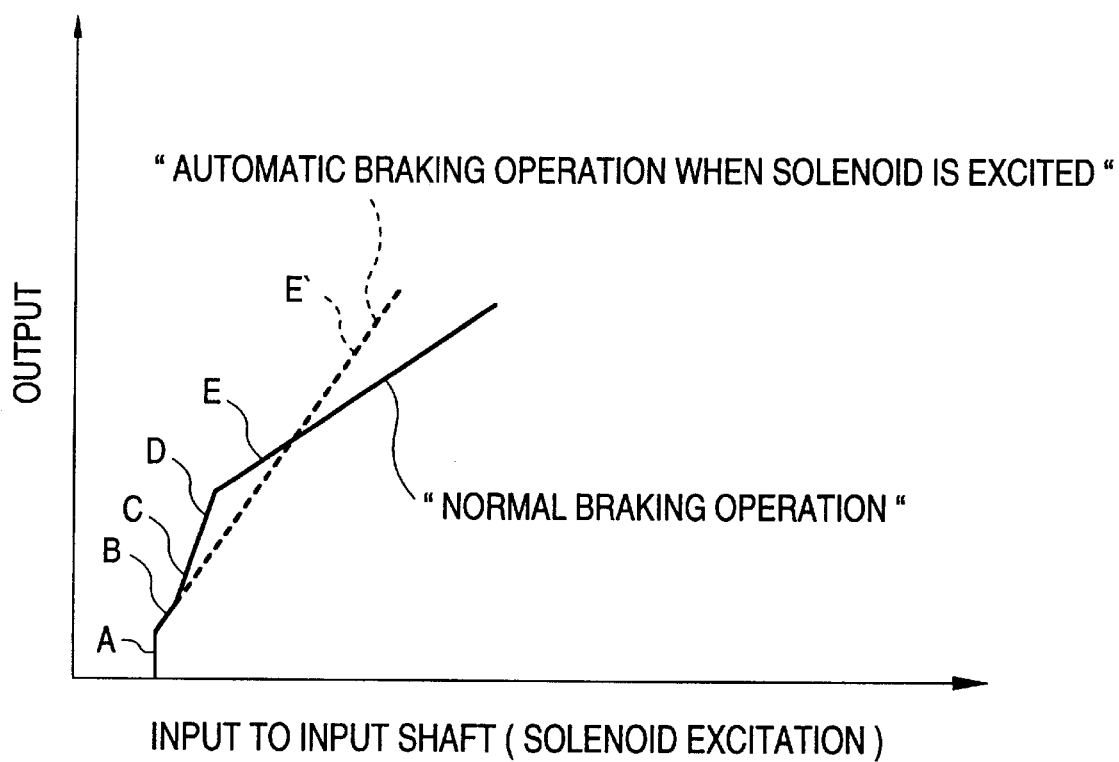
FIG. 11 is a characteristic curve chart of the sixth embodiment of the invention.

As shown in FIG. 11 then, the output is sharply raised (straight line A) without the transmission of counterforce until a reaction disc 541 compressed between the holder 535 (a valve body 506) and an output shaft 542 contacts the first member 571 moved closer than the second member 572 and when the reaction disc contacts the first member 571, the braking counterforce is transmitted to the valve plunger 525 via the cylindrical portion 573, the drive portion 550, the coil spring 553 and the valve seat portion 551. Consequently, the output is sharply raised along the inclination of a straight line B until the set load of the coil spring 553 exceeds the counterforce.

When the braking counterforce exceeds the set load of the coil spring 553, thus causing the coil spring to be compressed, the output is sharply raised along the inclination of a straight line C. When the reaction disc 541 contacts the front-side edge face of the second member 572 even after the output is sharply raised along the inclination of a straight line D after the first member 571 is seated on the second member 572, braking counterforce acting on the first and second members 571 an 572 is simultaneously transmitted, so that the output is gently raised up to the whole load condition along the inclination of a straight line E thereafter.

Therefore, as the straight lines from A, B, C up to D are equivalent to substantial jumping, the driver can control the braking counterforce with the same sense of operating any one of the conventional brake boosters in general substantially without a feeling of wrongness.

On the other hand, the drive portion 550, the valve seat portion 551, the cylindrical portion 573 and the first member 571 in contact with the cylindrical portion are moved forward while holding the condition illustrated during the automatic braking operation when the solenoid 523 is excited.

Then the reaction disc 541 compressed between the holder 535 and the output shaft 542 immediately contacts the first member 571 close thereto and braking counterforce acting on the first member 571 is also immediately transmitted to the sleeve 518. Whereas the second member 572 is moved back by the reaction disc 541 and brought into contact-with valve body 506, so that the output is raised along a predetermined straight line E' shown by a chain line thereafter.

In the sixth embodiment of the invention, which is different from the first to fifth embodiments thereof, braking output from a small output area is made smoothly controllable by varying the magnetic force of the solenoid 23 because the jumping during the automatic braking operation is set smaller.

The present invention has the effect of improving operating response performance at the abrupt braking time during the normal braking operation without impairing operating response performance during the automatic braking operation and also making possible smooth braking output control during the automatic braking operation.

What is claimed is:

1. An automatic brake booster, comprising:
    a valve body slidably provided within a shell;
    power pistons provided on said valve body;
    a constant pressure chamber;
    a variable pressure chamber, said variable pressure chamber and said constant pressure chamber being formed in front of and behind each of said power pistons; and
    a valve mechanism for controlling the switching of passages provided in said valve body;
    wherein said valve mechanism includes a first valve seat formed in said valve body, a sleeve slidably fitted into said valve body, a second valve seat formed on said sleeve, valve discs seated respectively on said first and second valve seats, drive means for switching the passages by displacing said sleeve frontward, and a valve plunger which is relatively displaceably provided for said valve body and said sleeve, and which is interlocked with an input shaft, said valve plunger for switching the passages by displacing said sleeve frontward when said input shaft is moved forward;
    wherein said sleeve includes a drive portion which is displaced frontward by said drive means, a valve seat portion which is displaced frontward by said valve plunger and forms said second valve seat, a mating portion for displacing said valve seat portion frontward by mating with said valve seat portion when said drive portion is displaced frontward, and an elastic member which is disposed between said drive portion and said valve seat portion; and
    wherein said elastic member maintains said drive portion and said valve seat portion separated from each other when said drive portion is displaced frontward by said drive means, wherein said elastic member is compressed when said valve seat portion is displaced frontward by said valve plunger so as to increase the opening amount of said second valve seat by moving said drive portion closer to said valve seat portion.

2. An automatic brake booster, comprising:
    a valve body slidably provided within a shell;
    power pistons provided on said valve body;
    a constant pressure chamber and a variable pressure chamber formed in front of and behind each of said power pistons; and
    a valve mechanism for controlling the switching of passages provided in said valve body;

wherein said valve mechanism includes a first valve seat formed in said valve body, a sleeve slidably fitted into said valve body, a second valve seat formed on said sleeve, valve discs seated respectively on said first and second valve seats, drive means for switching the passages by displacing said sleeve frontward, and a valve plunger which is relatively displaceably provided for said valve body and said sleeve, and which is interlocked with an input shaft, said valve plunger for switching the passages by displacing said sleeve frontward when said input shaft is moved forward;

wherein an elastic member is disposed by forming a predetermined space between the front side of said sleeve and said valve body; and wherein said elastic member restrains said sleeve from being displaced frontward such that said elastic member (1) is not compressed when said sleeve is displaced frontward by said drive means and (2) is compressed when said sleeve is displaced frontward by said valve plunger so as to increase the opening amount of said second valve seat.

3. An automatic brake booster, comprising:

a valve body slidably provided within a shell;

power pistons provided on said valve body;

a constant pressure chamber;

a variable pressure chamber, said variable pressure chamber and said constant pressure chamber being formed in front of and behind each of said power pistons;

a valve mechanism provided for said valve body;

an input shaft for switching the passages of said valve mechanism by reciprocally moving a valve plunger of said valve mechanism;

an output shaft slidably provided in said valve body;

a reaction disc; and a plate plunger, said plate plunger and said reaction disc being installed between the base of said output shaft and said valve plunger;

wherein said valve mechanism includes a first valve seat formed in said valve body, a sleeve slidably fitted into said valve body, a second valve seat formed on said sleeve, valve discs seated respectively on said first and second valve seats, drive means for switching the passages by displacing said sleeve frontward, and said valve plunger which is relatively displaceably provided for said valve body and said sleeve, and which is interlocked with said input shaft, said valve plunger for switching the passages by displacing said sleeve frontward when said input shaft is moved forward;

wherein (1) said plate plunger has a first member and a second member which are axially movable with respect to each other and mutually contactable with said reaction disc, (2) said first member mates with said second member and transmits braking counterforce acting on said second member and braking counterforce acting on said first member to said valve plunger during a normal braking operation, and (3) said first member is axially separatable from said second member kept in contact with said valve body to transmit braking counterforce acting on said first member to said sleeve.

4. An automatic brake booster as claimed in claim 3, wherein a predetermined gap is formed between said first member and said sleeve while said booster is not operating.

5. An automatic brake booster as claimed in claim 4, wherein the gap between said first member and said sleeve is set greater than the combination of the gap between said second member and said valve body and the gap between said second valve seat and said valve disc.

6. An automatic brake booster as claimed in claim 3, wherein said sleeve includes (1) a valve seat portion fitted onto said valve plunger, and (2) a forward portion that is axially moveable relative to said valve seat portion, said forward portion adapted to contact said first member of said plate plunger.

7. An automatic brake booster, comprising:

a valve body slidably provided within a shell;

power pistons provided on said valve body;

a constant pressure chamber;

a variable pressure chamber, said variable pressure chamber and said constant pressure chamber being formed in front of and behind each of said power pistons;

a valve mechanism provided for said valve body;

an input shaft for switching the passages of said valve mechanism by reciprocally moving a valve plunger of said valve mechanism;

an output shaft slidably provided in said valve body;

a reaction disc; and a plate plunger, said plate plunger and said reaction disc being installed between the base of said output shaft and said valve plunger;

wherein said valve mechanism includes a first valve seat formed in said valve body, a sleeve slidably fitted into said valve body, a second valve seat formed on said sleeve, valve discs seated respectively on said first and second valve seats, drive means for switching the passages by displacing said sleeve frontward, and said valve plunger which is relatively displaceably provided for said valve body and said sleeve, and which is interlocked with said input shaft, said valve plunger for switching the passages by displacing said sleeve frontward when said input shaft is moved forward;

wherein said plate plunger has a first member and a second member which are axially and relatively displaceable;

wherein said first member makes contact with said sleeve and transmits braking counterforce acting on said first member via said sleeve to said valve plunger during a normal braking operation and transmits braking counterforce acting on said first member to said sleeve separated from said valve plunger during an automatic braking operation; and wherein said second member makes contact with said valve plunger and transmits braking counterforce acting on said second member to said valve plunger during the automatic braking operation, and makes contact with said valve body and transmits braking counterforce acting on said second member to said valve body during the normal braking operation.

8. An automatic brake booster as claimed in one of claims 1–7, wherein the drive means is a solenoid.

* * * * *